US010823568B2

(12) United States Patent
Liukku et al.

(10) Patent No.: US 10,823,568 B2
(45) Date of Patent: *Nov. 3, 2020

(54) CAPACITIVE MICROELECTROMECHANICAL ACCELEROMETER

(71) Applicant: MURATA MANUFACTURING CO., LTD., Nagaokakyo-shi, Kyoto (JP)

(72) Inventors: Matti Liukku, Helsinki (FI); Ville-Pekka Rytkönen, Klaukkala (FI)

(73) Assignee: MURATA MANUFACTURING CO., LTD., Nagaokakyo-shi, Kyoto (JP)

(*) Notice: Subject to any disclaimer, the term of this patent is extended or adjusted under 35 U.S.C. 154(b) by 202 days.

This patent is subject to a terminal disclaimer.

(21) Appl. No.: 15/970,928

(22) Filed: May 4, 2018

(65) Prior Publication Data
US 2018/0321038 A1   Nov. 8, 2018

(30) Foreign Application Priority Data

May 8, 2017  (FI) ...................................... 20175405

(51) Int. Cl.
*G01C 19/5712*    (2012.01)
*G01P 15/125*    (2006.01)
(Continued)

(52) U.S. Cl.
CPC ....... *G01C 19/5712* (2013.01); *G01C 25/005* (2013.01); *G01P 15/125* (2013.01);
(Continued)

(58) Field of Classification Search
CPC .............. G01C 19/5705; G01C 19/5712; G01C 25/00; G01C 25/005; G01P 1/00;
(Continued)

(56) References Cited

U.S. PATENT DOCUMENTS 5,488,864 A * 2/1996 Stephan ................ G01P 15/125
                                                                73/514.32
5,731,520 A    3/1998 Stevenson et al.
(Continued)

FOREIGN PATENT DOCUMENTS

CN         102023234 A    4/2011
CN         105452876 A    3/2016
(Continued)

OTHER PUBLICATIONS

Finnish Search Report dated Dec. 22, 2017 corresponding to Finnish Patent Application No. 20175405.
(Continued)

*Primary Examiner* — Nguyen Q. Ha
(74) *Attorney, Agent, or Firm* — Squire Patton Boggs (US) LLP

(57) ABSTRACT

This disclosure describes a capacitive micromechanical accelerometer with at least a first sensor which comprises a rotor which is a two-sided seesaw frame. The rotor comprises one or more first damping plates on the first side of its rotation axis and one or more first damping plates on the second side of its rotation axis. One or more second damping plates are fixed to the inner package plane above or below at least some of the one or more first damping plates, so that at least one first damping plate overlaps with the projection of a second damping plate on each side of the axis. The frame-shaped rotor may surround second and third acceleration sensors located in the substrate plane.

10 Claims, 6 Drawing Sheets

(51) Int. Cl.
*G01C 25/00* (2006.01)
*G01P 15/08* (2006.01)

(52) U.S. Cl.
CPC ............... *G01P 2015/0831* (2013.01); *G01P 2015/0882* (2013.01)

(58) Field of Classification Search
CPC ........ G01P 15/00; G01P 15/125; G01P 15/18; G01P 21/00; G01P 2015/0831; G01P 2015/0882
See application file for complete search history.

(56) References Cited

U.S. PATENT DOCUMENTS

| | | | |
|---|---|---|---|
| 5,831,164 A | 11/1998 | Reddi et al. | |
| 7,210,352 B2 | 5/2007 | Foster et al. | |
| 9,575,088 B2 * | 2/2017 | Liukku | G01P 15/0802 |
| 2003/0106372 A1 | 6/2003 | Adams et al. | |
| 2004/0261529 A1 | 12/2004 | Yoshida et al. | |
| 2006/0277997 A1 | 12/2006 | Foster et al. | |
| 2007/0119252 A1 | 5/2007 | Adams et al. | |
| 2007/0193355 A1 | 8/2007 | Axelrod et al. | |
| 2008/0011080 A1 | 1/2008 | Merassi et al. | |
| 2009/0107238 A1 | 4/2009 | Guo | |
| 2010/0223998 A1 | 9/2010 | Ackerley et al. | |
| 2011/0023606 A1 | 2/2011 | Burghardt et al. | |
| 2013/0263662 A1 * | 10/2013 | Tanaka | G01P 1/003 73/504.12 |
| 2014/0083190 A1 * | 3/2014 | Kaack | G01P 15/125 73/514.14 |

FOREIGN PATENT DOCUMENTS

| | | |
|---|---|---|
| EP | 3014284 A1 | 5/2016 |
| JP | 2005-249454 A | 9/2005 |
| TW | 201514499 A | 4/2015 |
| WO | 2014207709 A1 | 12/2014 |

OTHER PUBLICATIONS

Finnish Search Report dated Dec. 14, 2017 corresponding to Finnish Patent Application No. 20175404.
Taiwanese Search Report application No. 107113200 dated Dec. 24, 2018.
Aug. 14, 2018 Search Report issued in European Patent Application No. 18170493.

* cited by examiner

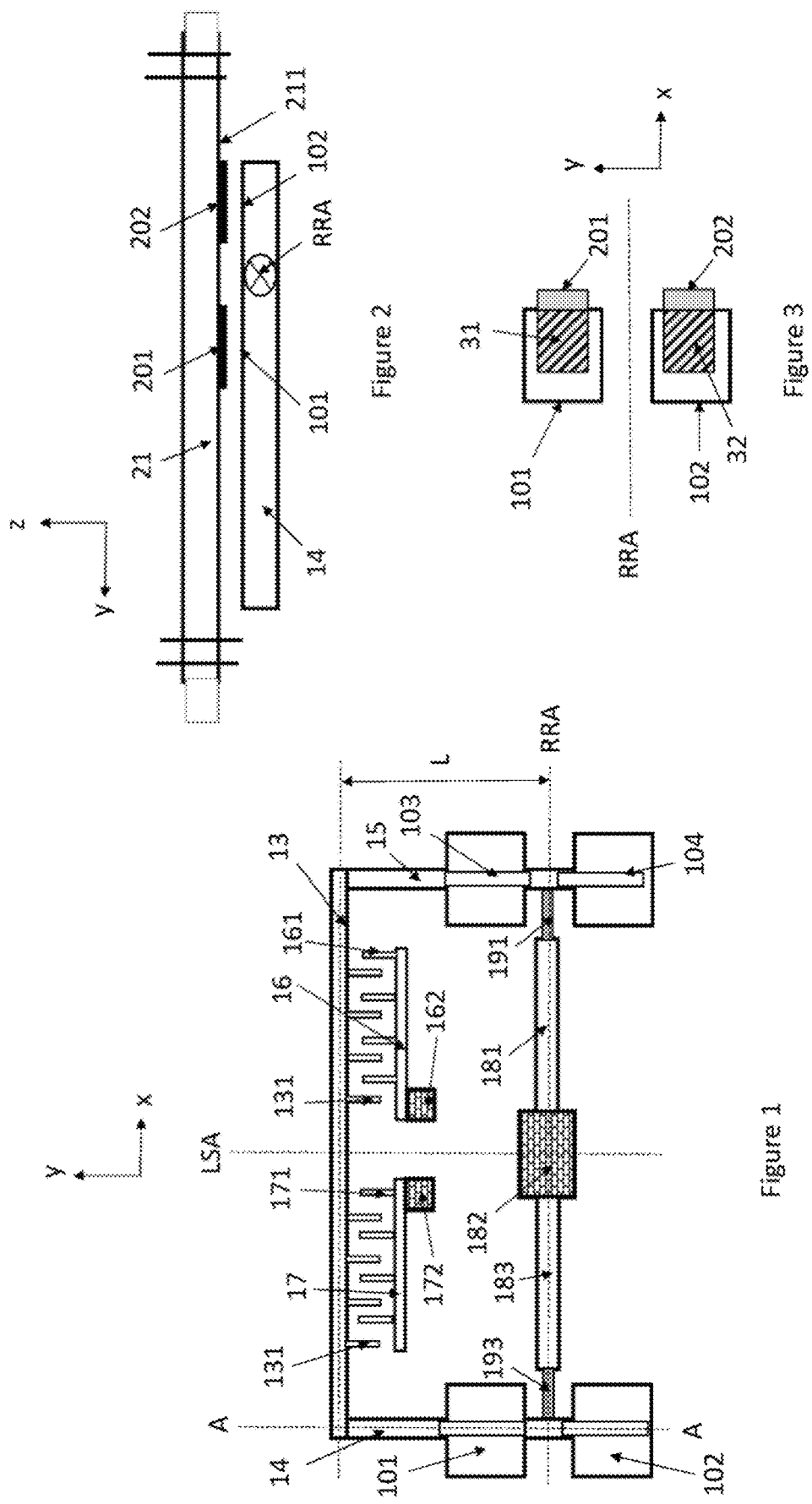

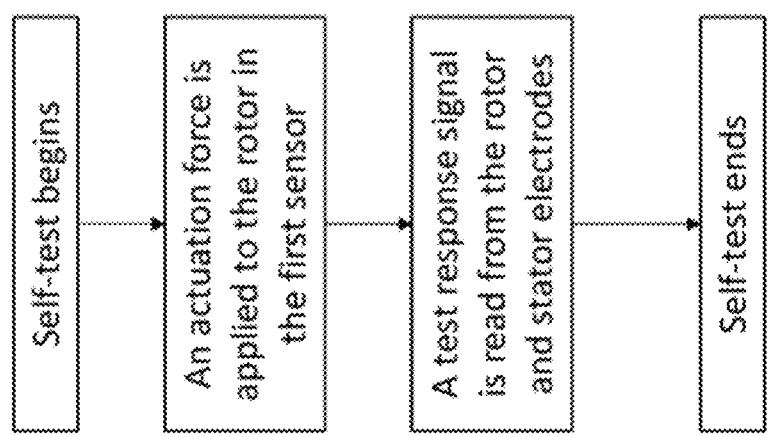

CAPACITIVE MICROELECTROMECHANICAL ACCELEROMETER

BACKGROUND

Field

This disclosure relates to capacitive accelerometers and to acceleration sensors with movable rotors which may rotate out of a substrate plane when the accelerometer undergoes movement with an acceleration component perpendicular to the substrate plane. Such sensors may be combined with two other sensors which measure acceleration in the substrate plane to form a three-axis accelerometer. Such accelerometers may be used in automotive applications, such as Electronic Stability Control (ESP/ESC), Antilock Braking (ABS), Electric Parking Brake (EPB), Hill Start Assistance (HSA), Electronically Controlled Suspension (ECS), headlight levelling or airbag deployment.

Description of the Related Art

Each capacitive sensor in a three-axis accelerometer may comprise a stator which is immobile in relation to the substrate and a rotor which is at least partly mobile in relation to the substrate. In this disclosure the terms "rotor" and "stator" both refer to interlinked micromechanical structures, such as bars or beams. The structures and their interconnections may be formed by etching a substrate, for example a silicon substrate.

In this disclosure, the terms "bar" and "beam" refer to elongated structures, for example made of silicon, which are rigid compared to more flexible structures which may be called "springs". Rigidity and flexibility are relative terms. Although the bars and beams which constitute a rotor will have some flexibility, they will still to a good approximation retain their mutual positions in relation to each other when the rotor moves, and only the springs from which the rotor is suspended will undergo significant flexible deformation due to the movement.

Rotors and stators typically comprise electrically conducting electrode areas on at least some of their interlinked structures to facilitate electrical measurements between the rotor and the stator.

A three-axis accelerometer typically comprises a substrate plane, which may be labelled the xy-plane. Stators may be fixed structures in the substrate plane. Acceleration sensors may be implemented in the substrate plane with rotors which undergo linear motion along an axis in the plane in response to accelerating movement along that axis. This disclosure focuses primarily on acceleration sensors where the rotor is implemented as a seesaw, so that it is attached to one or more torsion springs and undergoes rotational motion about a rotational axis defined by the torsion springs in response to accelerating movement which is not parallel to that axis.

If the rotor is implemented as a seesaw, its center of mass should not coincide with the rotational axis, because that would make it unresponsive to linear acceleration. A seesaw rotor should therefore be an unbalanced seesaw, at least to some extent. A seesaw rotor may be implemented as a completely one-sided seesaw, so that all parts of the rotor lie on one side of the rotational axis. More precisely, a seesaw rotor is one-sided if it is possible to draw a plane which crosses its rotation axis so that the entire rotor lies on one side of the plane. A rotor implemented as a seesaw may also be two-sided, so that some parts of the rotor lie on one side of the axis and some parts on the opposite side of the axis. For a two-sided rotor, it is not possible to draw a plane which crosses its rotation axis so that the entire rotor lies on one side of the plane.

Document US2007119252 discloses a three-axis accelerometer comprising acceleration sensors for measuring acceleration in the substrate plane and for measuring out-of-plane acceleration, i.e. acceleration in the direction perpendicular to the substrate plane. A disadvantage with the rotors employed for out-of-plane measurement in this document is that they tend to be sensitive to vibration and mechanical shocks.

Document US20110023606 also discloses a three-axis accelerometer comprising acceleration sensors for measuring acceleration in the substrate plane and for measuring out-of-plane acceleration. A disadvantage with the rotors employed for out-of-plane measurement in this document is that they consume a lot of device area and are sensitive to external stresses.

SUMMARY

An object of the present disclosure is to provide an apparatus for alleviating the above disadvantages.

The objects of the disclosure are achieved by an arrangement which is characterized by what is stated in the independent claims. The preferred embodiments of the disclosure are disclosed in the dependent claims.

The disclosure is based on the idea of implementing a z-axis acceleration sensor with a frame-shaped rotor which is a two-sided seesaw, and forming symmetrically placed damping areas on the seesaw on both sides of its axis of rotation.

An advantage of the arrangement of the disclosure is that the structure becomes robust against vibrations and produces efficient damping while consuming little device area.

BRIEF DESCRIPTION OF THE DRAWINGS

In the following the disclosure will be described in greater detail by means of preferred embodiments with reference to the accompanying drawings, in which FIG. 1 illustrates a first sensor in a capacitive accelerometer.

FIG. 2 illustrates a part of the first sensor and the accelerometer package in the cross-section A-A from FIG. 1.

FIG. 3 illustrates a first example of areal overlap between first and second damping plates.

FIG. 9 illustrates a method described in this disclosure.

Figure 5:
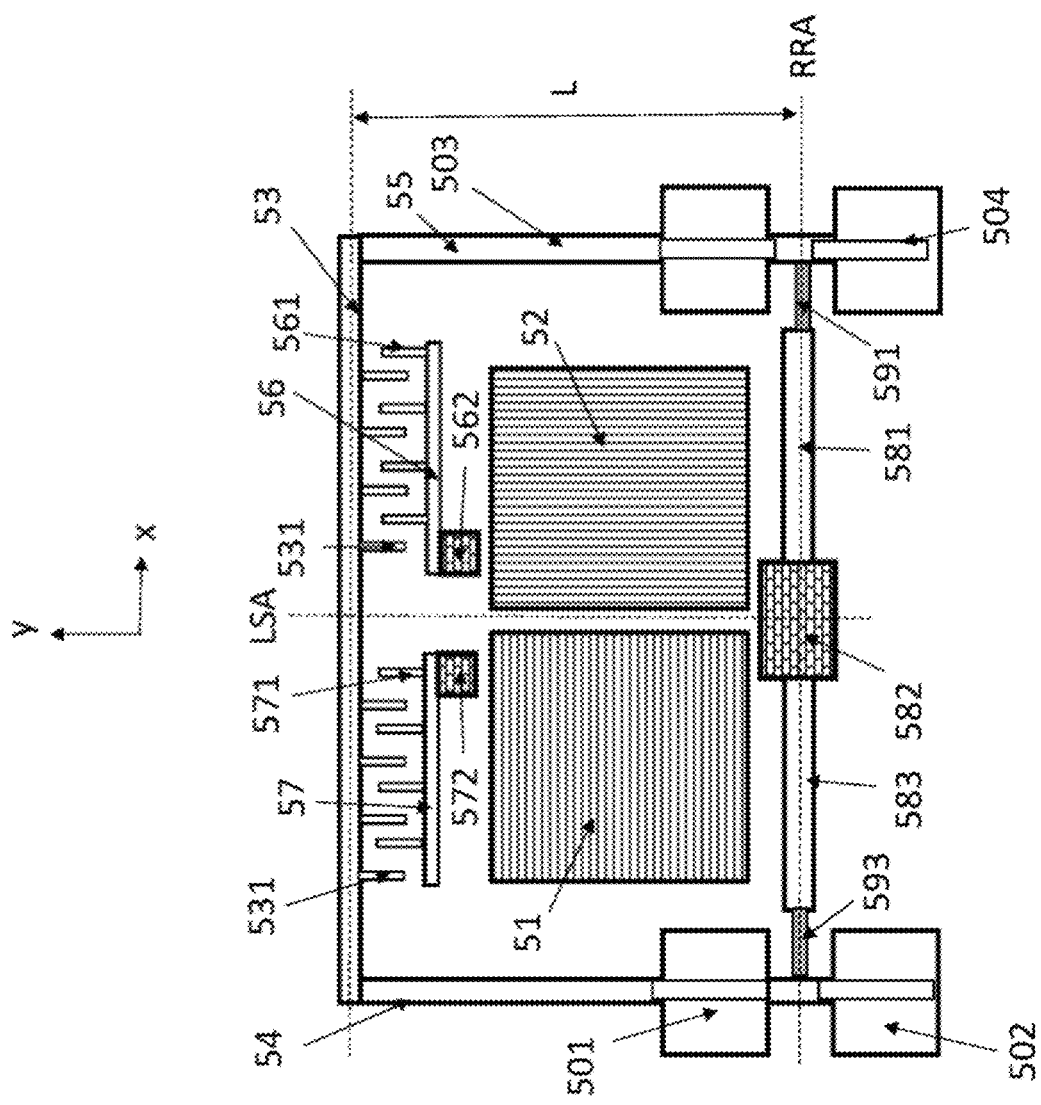
FIGS. 5-8 illustrate embodiments where the accelerometer also includes second and third sensors.

The illustrations are schematic and have not been drawn to scale.

DETAILED DESCRIPTION

This disclosure describes a capacitive micromechanical accelerometer comprising a substrate which defines a substrate plane which extends in a transversal direction and a longitudinal direction, the transversal direction being perpendicular to the longitudinal direction, a first sensor for measuring acceleration along a vertical axis perpendicular to the substrate plane, and an accelerometer package with an inner package plane which is adjacent and parallel to the substrate plane above and/or below the substrate plane. The first sensor comprises a rotor which is mobile in relation to the substrate, a rotor suspender, and one or more stators which are immobile in relation to the substrate. The rotor comprises one or more rotor electrodes and the one or more stators comprises one or more stator electrodes, the electrodes being configured for differential capacitive measurements. The suspender comprises one or more anchored rotor suspender bars and first and second transversal torsion springs aligned on a transversal rotor rotation axis, wherein the first and second transversal torsion springs are attached to the rotor.

The rotor is a two-sided seesaw frame comprising at least a transversal rotor bar, a first longitudinal rotor bar attached to the transversal rotor bar and a second longitudinal rotor bar attached to the transversal rotor bar, wherein each longitudinal rotor bar extends from a first side of the transversal rotor rotation axis to a second side of the transversal rotor rotation axis. Each longitudinal rotor bar comprises one or more first damping plates on the first side of the transversal rotor rotation axis and one or more first damping plates on the second side of the transversal rotor rotation axis. One or more second damping plates are fixed to the inner package plane above and/or below at least some of the one or more first damping plates, so that at least one first damping plate overlaps with the projection of a second damping plate to the substrate plane in a first overlap area on the first side of the transversal rotor rotation axis, and at least one first damping plate overlaps with the projection of a second damping plate to the substrate plane in a second overlap area on the second side of the transversal rotor rotation axis.

When the transversal torsion springs are placed far away from each other, the sensor becomes robust against vibrations because the parasitic resonance modes can be raised to higher frequencies where their vibration amplitude is smaller. Furthermore, placing damping electrodes far from each other also increases robustness because it allows them to produce more damping in the lowest parasitic resonance mode, which makes the vibration amplitude smaller.

FIG. 1 illustrates schematically a first sensor in a capacitive accelerometer. The substrate plane corresponds in this disclosure to the xy-plane. In this disclosure the term "substrate" refers to the body from which the micromechanical structures which constitute the sensor have been prepared. When the structures are completed, the remaining parts of the substrate form a supporting body which surrounds the accelerometer. The substrate may, for example, be a silicon wafer. The micromechanical structures which constitute the sensor may be manufactured from the substrate by etching and coating methods. In other words, in this disclosure the term "substrate" refers to a thin substrate which forms the structure layer (or device layer) from which the microelectromechanical structures in the accelerometer are manufactured. This substrate typically requires structural support from a separate, much thicker handle wafer or support wafer.

A vertical z-axis may be defined to be perpendicular to the xy-plane. Some of the micromechanical components depicted in FIG. 1 may have the same thickness as the substrate, others may have a smaller thickness. In this disclosure, the substrate in its entire thickness constitutes the xy-plane, and the terms "above" and "below" refer to differences in z-coordinates from the surface of the substrate. In other words, an object "above" the substrate plane depicted in FIG. 1 may be interpreted to lie closer to the viewer than the top surface of the components which is illustrated in FIG. 1, while an object "below" the substrate plane may be interpreted to lie further away from the viewer than the bottom surface of the components depicted in FIG. 1. FIG. 2 illustrates an accelerometer package 21 above the device component 14, which is in the substrate plane.

The first sensor is configured for measuring acceleration in the direction of the z-axis, which will be referred to as the vertical axis in this disclosure, and which is perpendicular to the substrate plane. The first sensor comprises a rotor which comprises a transversal rotor bar 13 and two longitudinal rotor bars 14 and 15. Together, the transversal rotor bar 13 and the two longitudinal rotor bars 14 and 15 form a frame which may partly surround other components on the substrate plane. The rotor also comprises a set of rotor electrode fingers 131, which function as rotor electrodes. The number of fingers may be much larger, and the separations between fingers much smaller, than what is schematically illustrated in FIG. 1.

The sensor in FIG. 1 also comprises two stators with transversal stator bars 16 and 17 and corresponding sets of stator electrode fingers 161 and 171, which function as stator electrodes. The rotor and stator electrodes may be coated, and they may be vertically recessed from the top and/or bottom face of the substrate. As illustrated in FIG. 1, the frame-shaped rotor may partly surround the stators. The transversal stator bars 16 and 17 are fixed to the substrate at stator anchor points 162 and 172. The term "anchor point" refers in this disclosure to a region where objects such as bars may be firmly attached to the substrate.

The location and number of rotor and stator electrodes, as well as their geometry and mutual positioning, may be optimized for capacitive measurements in many ways depending on the intended measurement application.

The rotor is suspended from a rotor suspender, which may be anchored to one or more rotor anchor points. In this disclosure, the term "suspender" refers to bars or beams which are connected in a sequence extending from the rotor anchor points to a pair of torsion springs. The rotor turns when the torsion springs, which are transversal, are twisted torsionally. In this disclosure, the bars or beams which constitute the suspenders do not themselves undergo a significant amount of bending or twisting. Their primary function is displacement. They allow the rotor anchor points to be located a certain distance from the torsion springs.

In this disclosure, the term "torsion spring" refers to silicon structures with aspect ratios which make them susceptible to torsional twisting about their lengthwise dimension. In this case, a "transversal" torsion spring means a spring whose lengthwise dimension is parallel with the x-axis in FIG. 1. Transversal torsion springs may be narrow in the y-direction to allow torsional twisting, but thick in the vertical z-direction to prevent translational movement out of the xy-plane. Alternatively, the transversal torsion springs may have a meandering shape in the xy-plane and be thick in the z-direction. Meandering springs can allow torsional twisting about the x-axis, for example, without necessarily being narrow in the direction of the y-axis.

FIG. 1 illustrates a sensor where the one or more anchored rotor suspender bars comprise a first transversal rotor suspender bar 181 and a second transversal rotor suspender bar 183, and where the first transversal torsion spring 191 is attached to the end of the first transversal rotor suspender bar 181, and the second transversal torsion spring 193 is attached to the end of the second transversal rotor suspender bar 183. The transversal rotor suspender bars 181 and 183 are anchored to the rotor anchor point 182. In other embodiments described below, additional suspender bars may be added between the anchored suspender bars and the torsion springs. These additional suspender bars may extend either in the transversal or the longitudinal direction, as described below.

The rotor, which comprises the transversal rotor bar 13 and the longitudinal rotor bars 14 and 15, may be termed a "seesaw" because the transversal torsion springs 191 and 193 allow the rotor to pivot about the transversal rotor rotation axis (RRA) illustrated in FIG. 1. This axis is determined by the location of the torsion springs 191 and 193. The two torsion springs must be aligned on the same axis to facilitate the rotation or pivoting of the rotor.

When the accelerometer undergoes accelerating motion in a vertical direction, the rotor can rotate about the transversal rotor rotation axis and this movement can be detected with a differential capacitive measurement conducted between the rotor and stator electrodes described above.

The rotor illustrated in FIG. 1 may also be characterized as a two sided-seesaw because it extends to both sides of the transversal rotor rotation axis (which may be hereafter referred to either as the RRA or as the transversal RRA). In other words, each longitudinal rotor bar 14 and 15 extends across the transversal rotor rotation axis, from a first side of the transversal rotor rotation axis to a second side.

This is illustrated from another angle in FIG. 2, which shows the cross-section A-A from FIG. 1. FIG. 2 shows the first longitudinal rotor bar 14 and the accelerometer package 21, with inner package plane 211 adjacent to the substrate plane. The longitudinal rotor bar 14 extends to both sides of the RRA. In other words, the rotor 14 extends both in a first direction and in a second direction from the RRA. These two directions are diametrically opposed, because the rotor forms a planar structure which rotates about the RRA. In FIG. 2, first longitudinal rotor bar lies in the substrate plane. The first direction is the positive y-direction and the second direction is the negative y-direction. When the accelerometer experiences acceleration in the direction of the z-axis, the rotor rotates about the RRA, out of the xy-plane. The stiffness of the torsion springs 191 and 193 should be configured to reach suitable movement with desired accelerations that are application-specific.

The package 21 extends beyond the first sensor to the left and right. The package surrounds the accelerometer on all sides, but the parts of the package which lie distant from the sensor are not relevant to this disclosure and are not illustrated in FIG. 2. The space between the package and the sensors is a sealed space, typically filled with an inert gas.

The rotor comprises damping plates which, together with adjacent damping plates in the package 21, may be configured to damp vibrations in the movement of the rotor. The damping plates on the rotor may, for example, be symmetrical quadratic protrusions in the longitudinal rotor bars 14 and 15, such as damping plates 101-104 in FIG. 1. However, the damping plates may also be protrusions in the longitudinal rotor bars with a rectangular form or any other form. Protrusions are required because the surface area of the narrow bar is by itself insufficient to generate a tangible damping effect.

In order to function as a damping plate, a first damping plate on the rotor (101-104) needs to be in close vertical proximity to a second damping plate on the accelerometer package. Second damping plates 201 and 202 may be manufactured on the inner package plane 211 either above or below first damping plates 101 and 102. An apparatus where the second damping plates have been manufactured above first damping plates 101 and 102 is illustrated in FIG. 2. Second damping plates 203 and 204 (not illustrated) may correspondingly be manufactured on the inner package plane either above or below first damping plates 103 and 104, respectively, in close vertical proximity to first damping plates 103 and 104. The vertical gap between the first and second damping plates may be between 0.5 µm and 5 µm. Separate stopping structures may be utilized to prevent the rotor from coming into contact with the package.

The first damping plates do not need to have exactly the same sizes, areas or xy-positions as the second damping plates. Damping takes place wherever a first damping plate overlaps with the projection of a second damping plate in the substrate plane. The projection of a second damping plate in the substrate plane is the area which lies in the xy-plane directly beneath the second damping plate in question. The area where the first damping plate overlaps with the projection may be called an overlap area. The first damping plates may be larger than the second damping plates, or vice versa.

Figure 4:
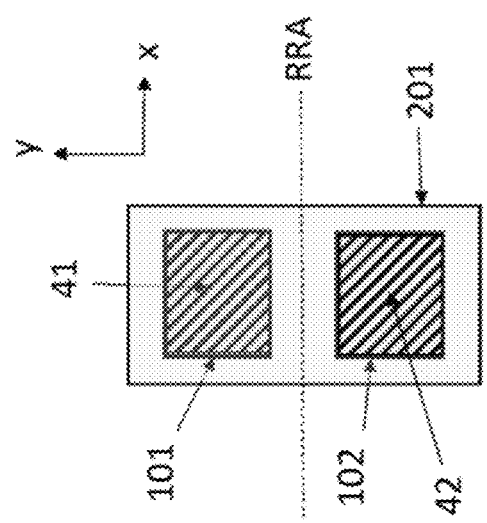
FIG. 4 illustrates a second example of areal overlap between first and second damping plates.

FIG. 3 illustrates two first damping plates and projections of two second damping plates to the substrate plane. The overlap area is illustrated with stripes. In the illustrated configuration, the first damping plates 101 and 102 on the rotor are larger than the second damping plates 201 and 202 on the package, and they overlap partially. The first overlap area is 31 and the second overlap area is 32. FIG. 4 illustrates a configuration where there is only one second damping plate 201 whose projection to the xy-plane covers both first damping plates 101 and 102. In this case the first overlap area 41 coincides with the damping plate 101, and the second overlap area 42 coincides with the damping plate 102.

In one embodiment, the damping effect is achieved by configuring at least one overlap area on each side of the rotor rotation axis. In other embodiments, the damping effect is achieved by arranging the first and second overlap areas symmetrically in relation to the rotor rotation axis. One form of symmetry is when all pairs of first and second overlap areas share the same shape, area and distance from the rotor rotation axis, as they do case in both FIGS. 3 and 4. The first and second overlap areas are in this case plane-symmetric in relation to the vertical plane where the transversal rotor rotation axis lies.

Symmetry in relation to the rotor rotation axis can also be understood in a less restricted way. The first and second overlap areas can be considered symmetric in relation to the transversal rotor rotation axis if the torsional damping coefficient in the first overlap area equals the torsional damping coefficient in the second overlap area. The torsional damping coefficient is present in the system's equation of motion for torsional movement $$J\frac{d^2\theta}{dt^2} + c\frac{d\theta}{dt} + \kappa\theta = M_{ext}$$

where c is the torsional damping coefficient, J is the moment of inertia, θ is the rotation angle, κ is the torsional spring constant, t is time, $$\frac{d^2\theta}{dt^2}$$

is the second derivate of θ with respect to t, $$\frac{d\theta}{dt}$$

is the first derivate of θ with respect to t and $M_{ext}$ is the external moment. The damping coefficient is a function of the damping area, the distance from the rotor rotation axis, the vertical gap between the first and the second damping plates and effective gas viscosity.

The accelerometer described above, with a first sensor configured to measure acceleration in a vertical direction perpendicular to the substrate plane, may be used in a three-axis accelerometer where two additional sensors are used for measuring accelerations in two orthogonal directions in the substrate plane. The three-axis accelerometer can be produced on a small area in the substrate plane if the frame-shaped first sensor partly surrounds these additional sensors. In the following description various alternative designs will be described for fitting several sensors on a small area.

A second sensor may be configured to measure acceleration in the direction of the x-axis, which may be referred to as the transversal axis in this disclosure. The second sensor may be a capacitive micromechanical acceleration sensor. A third sensor may be configured to measure acceleration in the direction of the y-axis, which may be referred to as the longitudinal axis in this disclosure. The transversal axis is orthogonal to the longitudinal axis. The third sensor may be a capacitive micromechanical acceleration sensor.

In addition to consumed area, other design consideration pertaining to the first sensor include the distance from the transversal rotor rotation axis to the measurement electrodes on the rotor and stator electrodes. The longer the distance, the greater the displacement of the rotor electrodes in relation to the stator electrodes, and the stronger the capacitive signal, which may be a capacitance change. In FIG. 1, and in the embodiments described below, the rotor electrode fingers 131 are attached only to the transversal rotor bar 13, so the distance between the electrodes and the rotor rotation axis can be represented by the distance L from the transversal rotor bar to the rotor rotation axis. The same distance optimization applies even if the rotor electrode fingers would be attached somewhere else on the rotor.

It is often beneficial to keep the rotor anchors and stator anchors fairly close to each other. Mechanical stresses will then move the rotor and stator approximately in the same way, and no error signal is produced in the differential capacitive measurement between the rotor and stator. The error signal is also smaller if the anchors are close to the transversal rotor bar where the finger electrodes are located. Furthermore, when the first and second torsion bars are far from each other on the rotor rotation axis, parasitic resonances move to higher frequencies. It is also beneficial to keep the damping plates far apart from each other in the transversal direction, because this allows the plates to effectively dampen vibrations mode where the rotor would rotate about its longitudinal axis of symmetry.

In FIG. 5, reference numbers 53-57, 501-504, 531-532, 561-562, 571-572, 581-583 and 591-593 indicate the same components as reference numbers 13-17, 101-104, 131-132, 161-162, 171-172, 181-183 and 191-193, respectively, in FIG. 1.

In the configuration illustrated in FIG. 1, the rotor anchor point 182 lies on the rotor rotation axis. FIG. 5 illustrates an embodiment where the accelerometer includes the same components as in FIG. 1, but in addition it also includes a second sensor 51 for measuring acceleration along the transversal x-axis, and a third sensor 52 for measuring acceleration along the longitudinal y-axis. The rotor (53, 54, 55) of the first sensor partly surrounds both the second sensor 51 and the third sensor 52. In this disclosure, "the rotor partly surrounds the sensor" means that three sides of each rectangular sensor 51 and 52 face towards a part of the rotor. The upper sides of the sensors in FIG. 5 face the transversal rotor bar 53, the left sides face the first longitudinal rotor bar 54, and the right sides face the second longitudinal rotor bar 55. In FIG. 5 the lower side of the sensors face the transversal rotor suspenders 581 and 583.

In the embodiment illustrated in FIG. 5, the one or more anchored rotor suspender bars comprise the first transversal rotor suspender bar 581 and the second transversal rotor suspender bar 583. The first transversal torsion spring 591 is attached to the end of the first transversal rotor suspender bar 581, and the second transversal torsion spring 593 is attached to the end of the second transversal rotor suspender bar 583. A long distance L is achieved in this configuration, but the rotor anchor point 582 lies quite far from the stator anchor points 562 and 572.

One way to shift the rotor anchor point closer to the stator anchor points, while still retaining a long distance L between the rotor rotation axis and the transversal rotor bar, is to attach the transversal torsion bars to longitudinal displacement bars. The other end of the longitudinal displacement bars, the end which does not lie on the rotor rotation axis, may be attached directly to anchor points or transversal bars.

Figure 6:
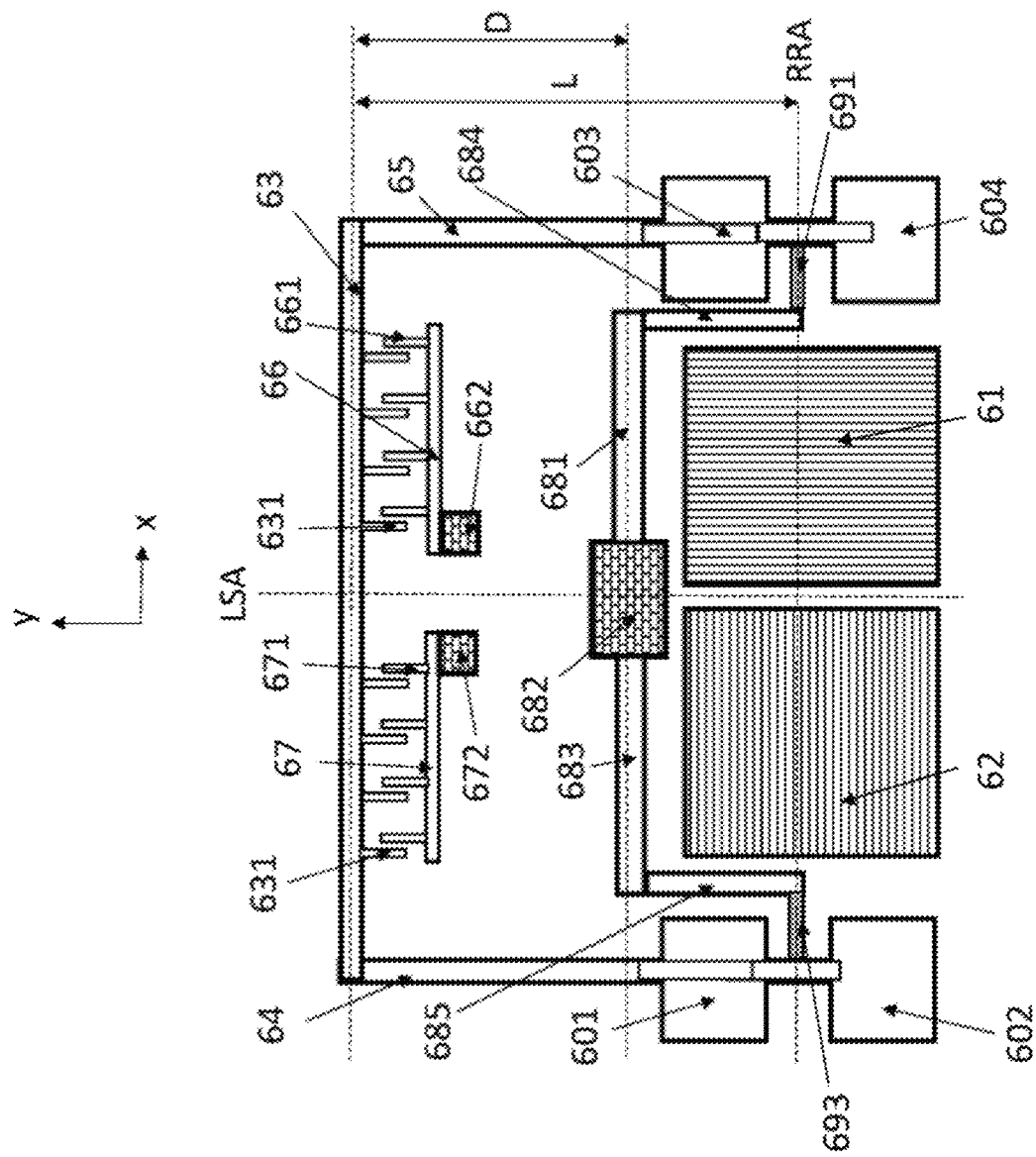

In FIG. 6, reference numbers 61-67, 601-604, 631-632, 661-662, 671-672, 681-683 and 691-693 indicate the same components as reference numbers 51-57, 501-504, 531-532, 561-562, 571-572, 581-583 and 591-593, respectively, in FIG. 5.

FIG. 6 illustrates an embodiment where the first transversal torsion spring 691 is attached to a first longitudinal displacement bar 684, and the first longitudinal displacement bar 684 is attached to the first transversal rotor suspender bar 681. Similarly, the second transversal torsion spring 693 is attached to a second longitudinal displacement bar 685, and the second longitudinal displacement bar 685 is attached to the second transversal rotor suspender bar 683. The first longitudinal displacement bar 684 extends from the first transversal rotor suspender bar 681 in the negative y-direction. In other words, it extends in a direction which points away from the transversal rotor bar 63. The second longitudinal displacement bar 685 similarly extends from the second transversal rotor suspender bar away from the transversal rotor bar 63. This allows the rotor anchor point 682 to be located close to the stator anchor points 662 and 672, but the distance L is still long. The distance D between the transversal line which crosses the rotor anchor point 682 and the transversal rotor bar 63 is shorter than the distance L, because the two longitudinal displacement bars 684 and 685 shift the rotor rotation axis further away from the transversal rotor bar 63. The rotor partly surrounds both the second sensor 61 and the third sensor 62.

When suspender bars and displacement bars are connected in sequence between the anchor point and the torsion bars, it is not necessary to attach each bar precisely to the end of the preceding bar. The attachment could also be made somewhere closer to the midpoint of the preceding bar.

Figure 7:
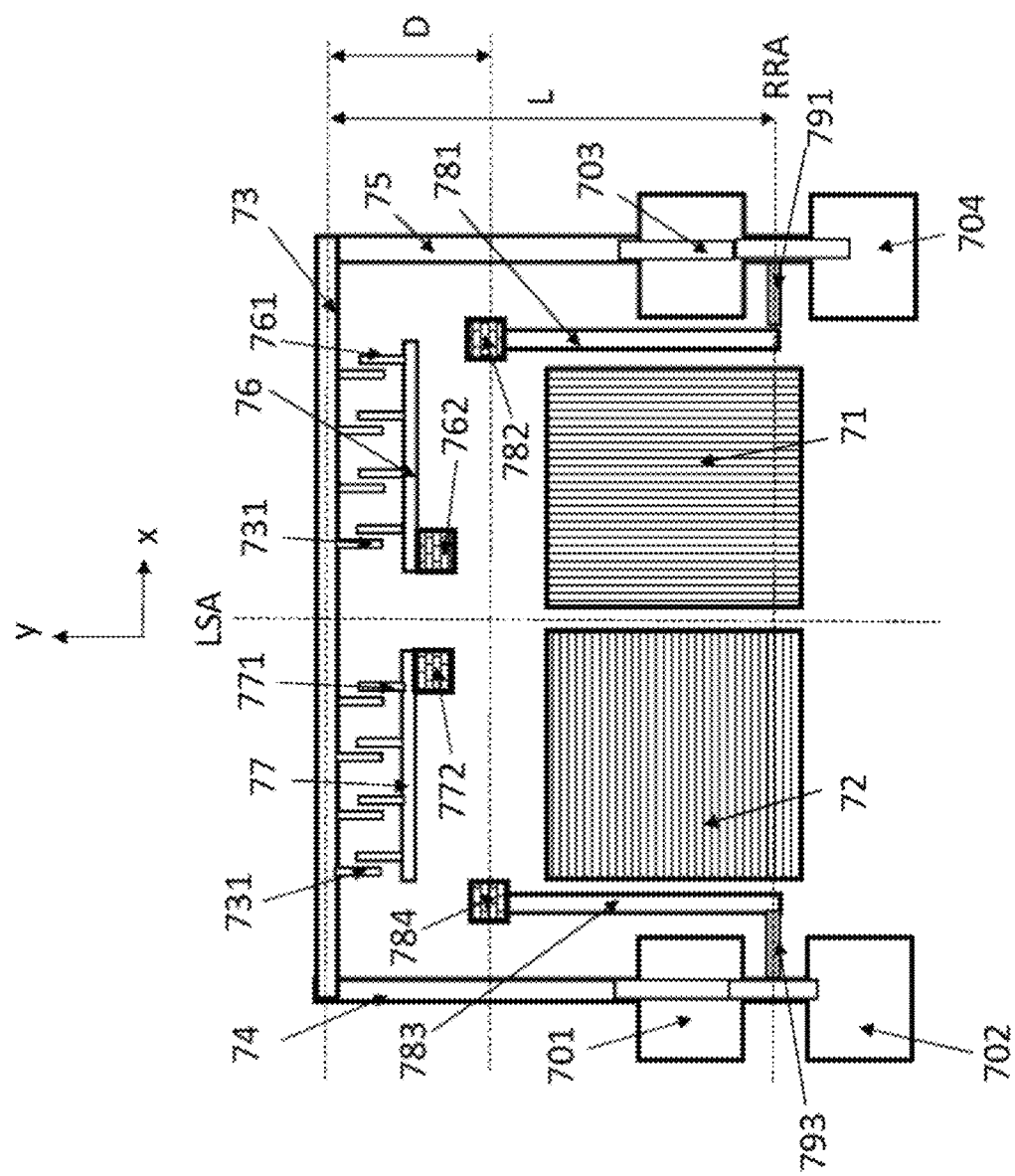

In FIG. 7, reference numbers 71-77, 701-704, 731-732, 761-762, 771-772 and 791-793 indicate the same components as reference numbers 51-57, 501-504, 531-532, 561-562, 571-572 and 591-593, respectively, in FIG. 5.

FIG. 7 illustrates an embodiment where the one or more anchored rotor suspender bars comprise a first longitudinal displacement bar 781 and a second longitudinal displacement bar 783. In other words, first longitudinal displacement bar 781 is attached from one end to first rotor anchor point 782 and second longitudinal displacement bar 783 is attached from one end to second rotor anchor point 784. The first transversal torsion spring 791 is attached to the other end of the first longitudinal displacement bar 781, and the second transversal torsion spring 793 is attached to the other end of the second longitudinal displacement bar 783. As seen in FIG. 7, both longitudinal displacement bars 781, 783 extend from their respective anchor points 782, 784 away from the transversal rotor bar 73. As before, the rotor partly surrounds both the second sensor 71 and the third sensor 72.

Figure 8:
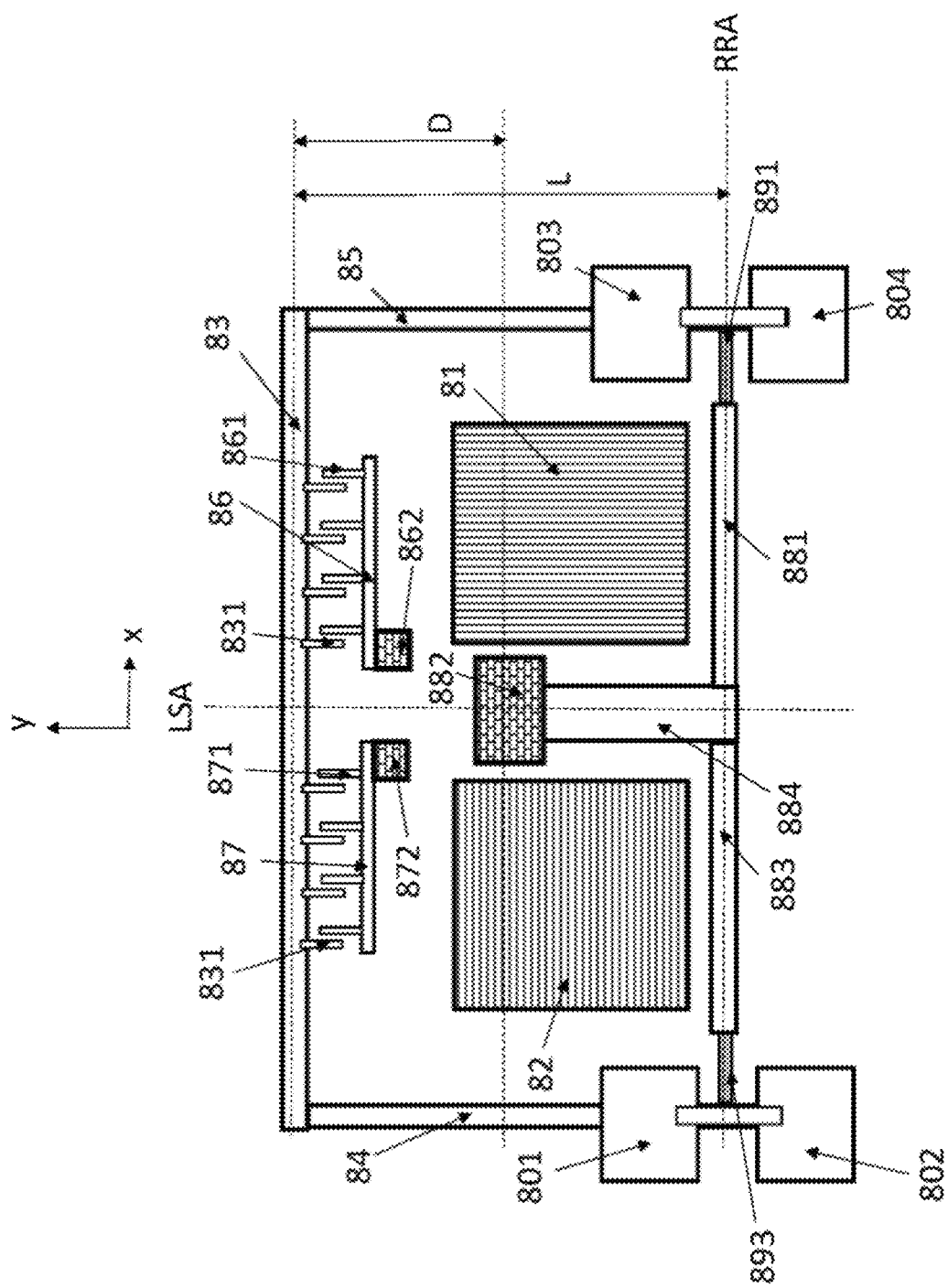

In FIG. 8, reference numbers 81-87, 801-804, 831-832, 861-862, 871-872 and 891-893 indicate the same components as reference numbers 51-57, 501-504, 531-532, 561-562, 571-572 and 591-593, respectively, in FIG. 5.

FIG. 8 illustrates an embodiment where there is only one anchored rotor suspender bar. This is the longitudinal rotor suspender bar 884 which lies on the longitudinal symmetry axis of the rotor and is attached to the rotor anchor point 882. The first transversal torsion spring 891 is attached to the end of a first transversal suspender bar 881, and the other end of the first transversal suspender bar 881 is attached to the longitudinal rotor suspender bar 884. The second transversal torsion spring 893 is attached to the end of a second transversal suspender bar 883, and the other end of the second transversal suspender bar 883 is attached to the longitudinal rotor suspender bar 884. As before, the rotor partly surrounds both the second sensor 81 and the third sensor 82.

It is also possible to alter the embodiment illustrated in FIG. 8 by making the longitudinal rotor suspender bar 884 longer. The first and second transversal suspender bars are thereby shifted downward in the figure. First and second longitudinal displacement bars may be attached from one end to the end of the first and second transversal suspension bars, respectively, and the other end of the first and second longitudinal displacement bars may be attached to the first and second transversal torsion springs 891 and 893, respectively. This arrangement may, for example, be employed if the second and third sensor are too large to fit inside the suspender and the suspender frame as indicated in FIG. 8.

The damping plates described above may also be used for other purposes. For example, the accelerometer may be equipped with a self-test function. When a self-test is performed, an actuation force is applied to the rotor in the first sensor, so that the rotor rotates about its transversal rotation axis. If the actuation force is known, and the response to the self-test is measured with a capacitive measurement from the rotor and stator electrodes of the first sensor, the test can be used to check if the sensitivity or measurement range of the sensor has changed. The accelerometer can perform this self-test autonomously, with a range of different actuation forces.

If one or more first damping plates, and at least the second damping plate whose projection to the substrate plane overlaps with this first damping plate, are electrically conducting electrodes connected to a voltage source, the actuation force required for self-testing can be applied to the rotor by applying a voltage to these opposing electrodes. If the rotor and the suspender are sufficiently rigid to resist rotational movement about the longitudinal symmetry axis of the first sensor, the self-test electrodes may be placed on only one first damping plate-second damping plate pair. Self-tests may also be performed with symmetric actuation using one electrode pair on damping plates on the left side of the longitudinal symmetry axis (LSA), and one electrode on the right side of the longitudinal symmetry axis.

In other words, a method for performing a self-test in an accelerometer described in this disclosure may comprise applying an actuation force to the rotor in the first sensor by applying a test voltage to damping plates with electrically conducting electrodes, and reading a test response signal with a capacitive measurement from the rotor and stator electrodes.

The invention claimed is:

1. A capacitive micromechanical accelerometer comprising
 a substrate which defines a substrate plane which extends in a transversal direction and a longitudinal direction, the transversal direction being perpendicular to the longitudinal direction,
 a first sensor for measuring acceleration along a vertical axis perpendicular to the substrate plane, and
 an accelerometer package with an inner package plane which is adjacent and parallel to the substrate plane above and/or below the substrate plane,
 wherein
 the first sensor comprises a rotor which is mobile in relation to the substrate, a rotor suspender, and one or more stators which are immobile in relation to the substrate,
 the rotor comprises one or more rotor electrodes and the one or more stators comprises one or more stator electrodes, the electrodes being configured for differential capacitive measurements,
 the suspender comprises one or more anchored rotor suspender bars and first and second transversal torsion springs aligned on a transversal rotor rotation axis, wherein the first and second transversal torsion springs are attached to the rotor,
 and wherein
 the rotor is a two-sided seesaw frame comprising at least a transversal rotor bar, a first longitudinal rotor bar attached to the transversal rotor bar and a second longitudinal rotor bar attached to the transversal rotor bar, wherein each longitudinal rotor bar extends from a first side of the transversal rotor rotation axis to a second side of the transversal rotor rotation axis, and
 each longitudinal rotor bar comprises one or more first damping plates on the first side of the transversal rotor rotation axis and one or more first damping plates on the second side of the transversal rotor rotation axis, and
 one or more second damping plates are fixed to the inner package plane above or below at least some of the one or more first damping plates, so that at least one first damping plate overlaps with the projection of a second damping plate to the substrate plane in a first overlap area on the first side of the transversal rotor rotation axis, and at least one first damping plate overlaps with the projection of a second damping plate to the substrate plane in a second overlap area on the second side of the transversal rotor rotation axis.

2. A capacitive micromechanical accelerometer according to claim 1, wherein the torsional damping coefficient in the first overlap area equals the damping coefficient in the second overlap area.

3. A capacitive micromechanical accelerometer according to claim 1, wherein the first overlap area is plane-symmetric with the second overlap area in relation to the vertical plane which includes the transversal rotor rotation axis.

4. A capacitive micromechanical accelerometer according to claim 1, wherein the accelerometer also comprises a second sensor for measuring acceleration along a transversal axis, and a third sensor for measuring acceleration along a longitudinal axis, and that the rotor partly surrounds both the second sensor and the third sensor.

5. A capacitive micromechanical accelerometer according to claim 4, wherein the one or more anchored rotor suspender bars comprise a first transversal rotor suspender bar and a second transversal rotor suspender bar, and that the first transversal torsion spring is attached to the end of the first transversal rotor suspender bar, and that the second transversal torsion spring is attached to the end of the second transversal rotor suspender bar.

6. A capacitive micromechanical accelerometer according to claim 4, wherein the one or more anchored rotor suspender bars comprise a first transversal rotor suspender bar and a second transversal rotor suspender bar, and that a first longitudinal displacement bar which is attached to the first transversal rotor suspender bar extends from the first transversal rotor suspender bar in a direction which points away from the transversal rotor bar, and that a second longitudinal displacement bar which is attached to the second transversal rotor suspender bar extends from the second transversal rotor suspender bar in a direction which points away from the transversal rotor bar, and that the first transversal torsion spring is attached to the first longitudinal displacement bar, and that the second transversal torsion spring is attached to the second longitudinal displacement bar.

7. A capacitive micromechanical accelerometer according to claim 4, wherein the one or more anchored rotor suspender bars comprise a first longitudinal displacement bar and a second longitudinal displacement bar, and that the first transversal torsion spring is attached to the end of the first longitudinal displacement bar, and that the second transversal torsion spring is attached to the end of the second longitudinal displacement bar, wherein both longitudinal displacement bars extend from their respective anchor points away from the transversal rotor bar.

8. A capacitive micromechanical accelerometer according to claim 4, wherein the one or more anchored rotor suspender bars comprise a longitudinal rotor suspender bar, and that the first transversal torsion spring is attached to the end of a first transversal suspender bar, and the other end of the first transversal suspender bar is attached to the longitudinal rotor suspender bar, and that the second transversal torsion spring is attached to the end of a second transversal suspender bar, and the other end of the second transversal suspender bar is attached to the longitudinal rotor suspender bar.

9. A capacitive micromechanical accelerometer according to claim 1, wherein at least one of the one or more first damping plates, and at least the second damping plate whose projection to the substrate plane overlaps with this first damping plate, are electrically conducting electrodes connected to a voltage source.

10. A method for performing a self-test in an accelerometer according to claim 9, wherein an actuation force is applied to the rotor in the first sensor by applying a test voltage to the damping plates which are electrically conducting electrodes, and that a test response signal is read with a capacitive measurement from the rotor and stator electrodes.

* * * * *